June 13, 1944.  E. M. DOWD ET AL  2,351,412
GRASS STRIPPER
Filed April 2, 1942   3 Sheets-Sheet 3

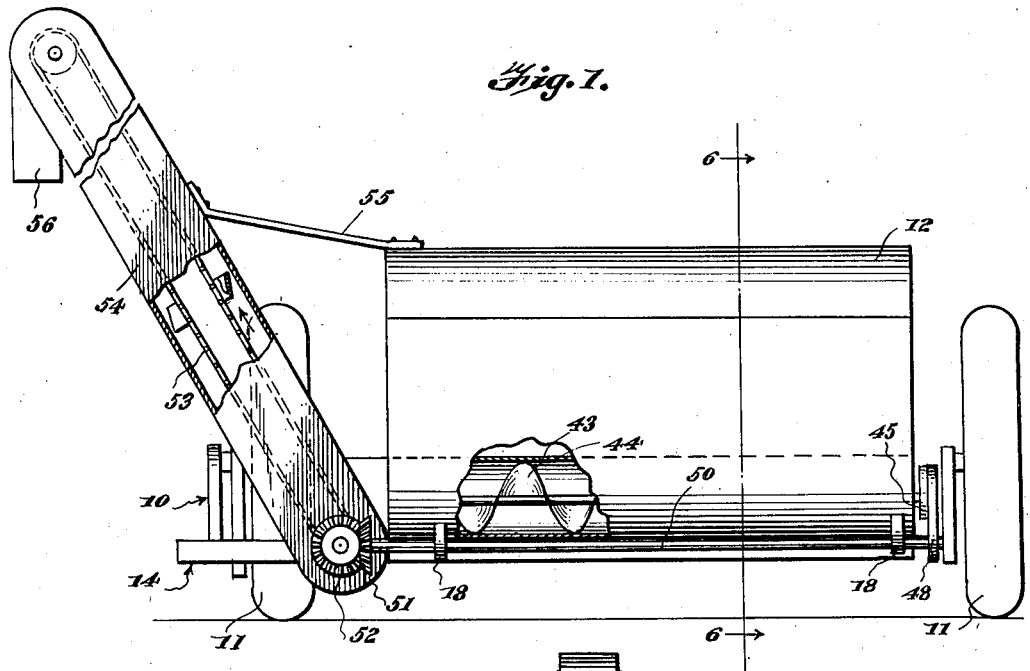
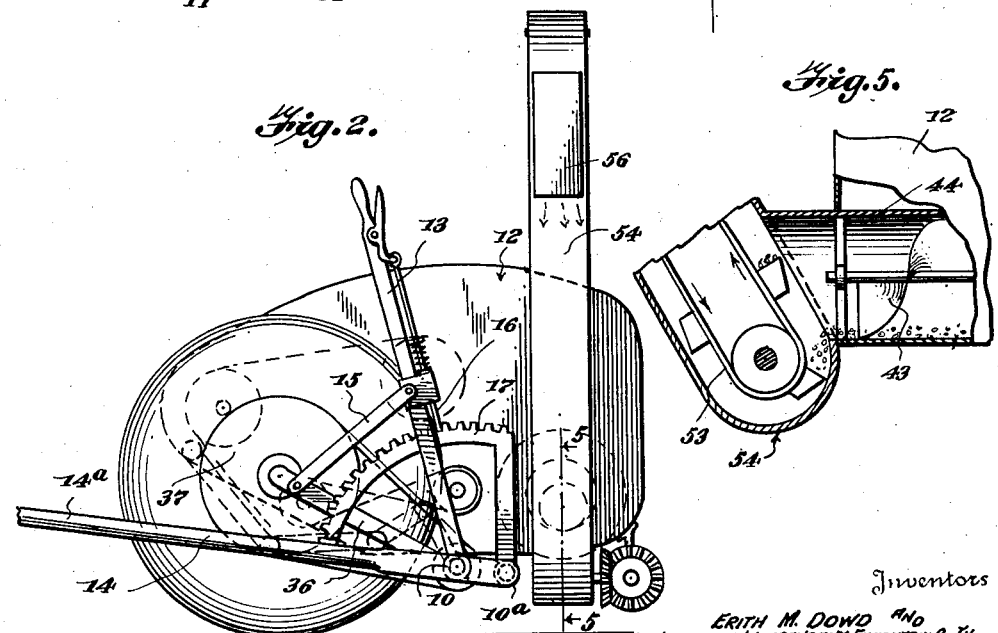

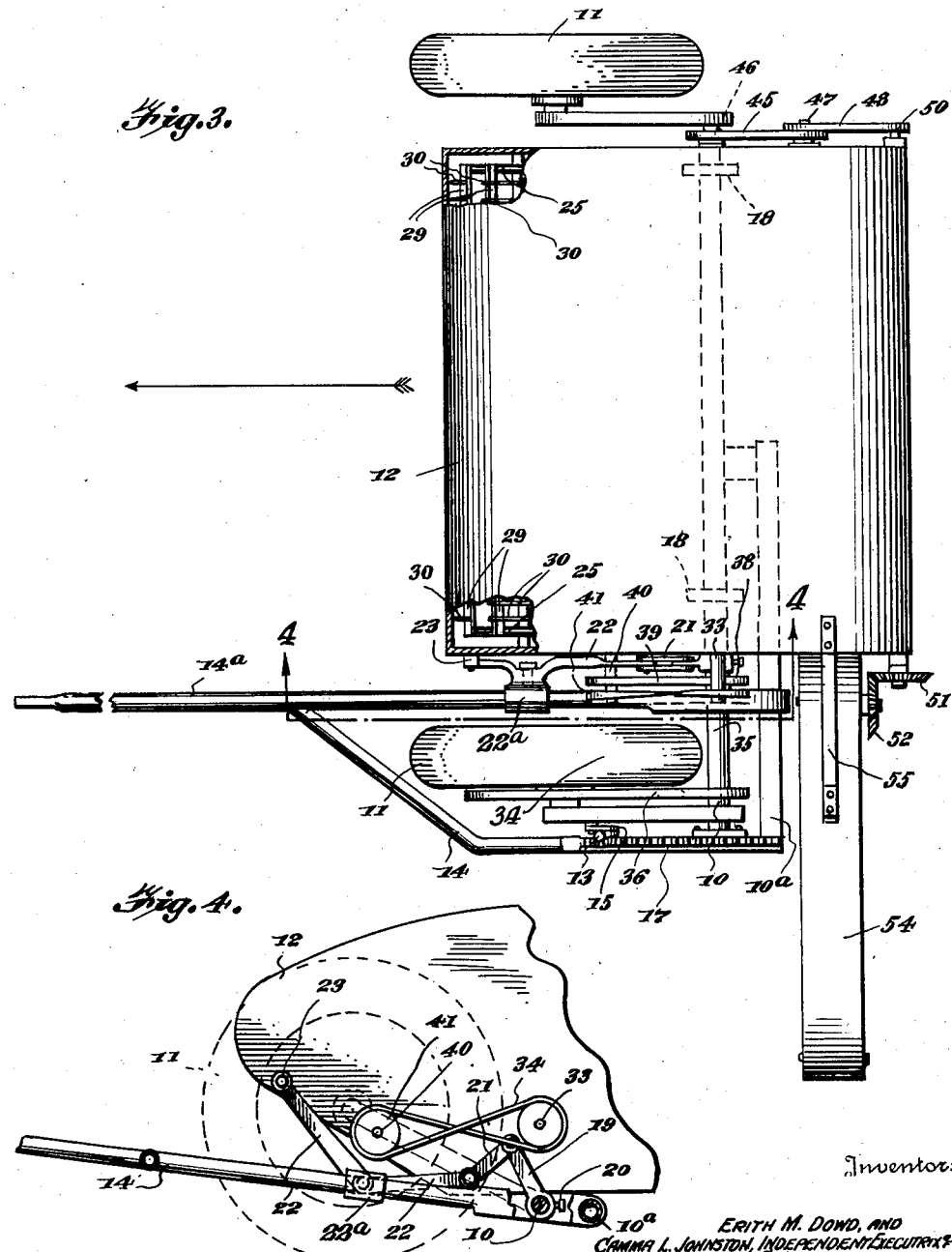

Inventors
ERITH M. DOWD AND
CAMMA L. JOHNSTON, INDEPENDENT EXECUTRIX OF THE
ESTATE OF CLARENCE S. JOHNSTON, DECEASED By
Attorney Patented June 13, 1944

2,351,412

UNITED STATES PATENT OFFICE 2,351,412

GRASS STRIPPER

Erith M. Dowd, Amarillo, Tex., and Clarence S. Johnston, deceased, late of Amarillo, Tex., by Camma L. Johnston, independent executrix, Amarillo, Tex.

Application April 2, 1942, Serial No. 437,448

6 Claims. (Cl. 56—130)

This invention relates to grass strippers and has for one of its objects the production of a simple and efficient means for facilitating the stripping of seed from grass while the grass is standing and uncut.

A further object of this invention is the production of a simple and efficient means for stripping seed from grass and then conveying this seed to a point of disposal such as a bagging means or a vehicle to transport the seed to a desired location.

Another object of this invention is the production of a simple and efficient means for facilitating the vertical adjustment of the machine to the heighth of the grass to be stripped.

Other objects and advantages of the present invention will appear throughout the following specification and claims.

In the drawings:

Figure 1 is a rear elevational view of the grass stripper;

Figure 2 is a side elevational view;

Figure 3 is a top plan view;

Figure 4 is a vertical sectional view taken on line 4—4 of Figure 3;

Figure 5 is a fragmentary vertical sectional view taken on line 5—5 of Figure 2;

Figure 6:
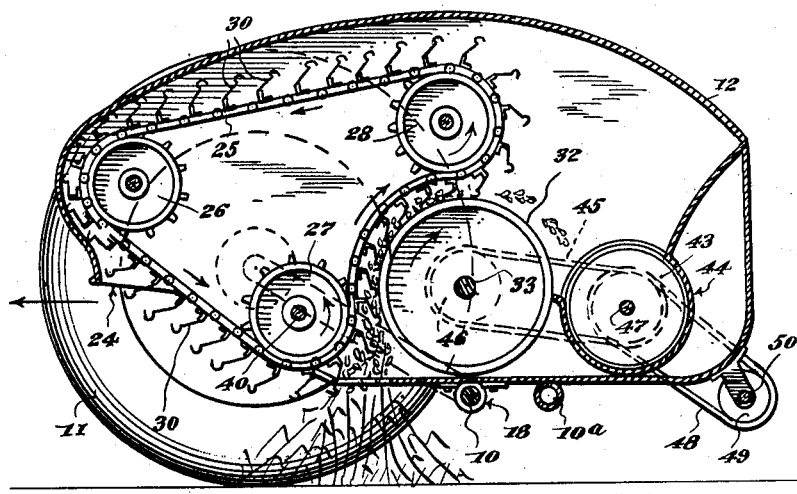
Figure 6 is a vertical sectional view taken on line 6—6 of Figure 1.
Figure 7:
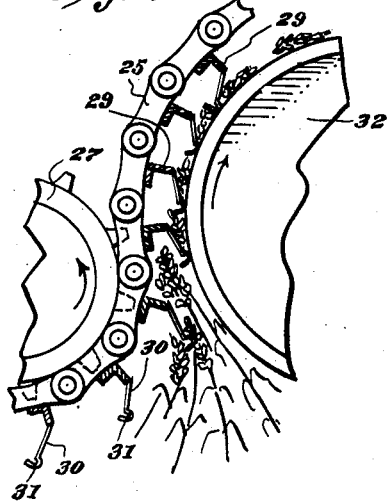
Figure 7 is an enlarged fragmentary sectional view through a series of stripper elements, portions of the supporting rollers being shown in elevation.

By referring to the drawings, it will be seen that 10 designates the crank axle which is supported upon the wheels 11. The body 12 is supported upon this crank axle 10, as shown. A rearwardly spaced off-set brace 10ª is carried by the axle 10 and extends under the body 12 for a portion of its length to limit the upward swing of the forward portion of the body 12. An axle-adjusting lever 13 is carried by the frame 14 which is located to one side of the body 12, and this lever 13 is connected to one end of the crank axle 10 by means of a link 15. The lever 13 may be locked in a set position by means of the latch 16 which engages the quadrant rack 17 supported upon the frame 14. The lever 13 is adapted to raise and lower the wheels 11 with respect to the body 12, to regulate the position of the body 12 in accordance with the heighth of the grass from which the seed is to be removed. The body 12 is hinged upon the axle 10 by means of the journals 18 so that the body 12 may be swung to an adjusted position. This adjustment may be obtained by adjusting the arm 19 and setting the arm 19 by the set-screw 20. This arm 19 engages the link 21 which link is connected to one end of the bell crank 22. The bell crank 22 is pivoted intermediate its ends upon a journal collar 22ª attached to the frame 14 and the opposite end of the bell crank 22 is pivoted at 23 to the front portion of the body 12. By adjusting the arm 19 in one direction, the forward end of the body 12 may be lowered and by adjusting the arm 19 in the opposite direction the forward end of the body 12 may be raised to the desired position for stripping seed from the standing grass.

The body 12 is provided with an open bottom portion 24 which open bottom portion 24 extends forwardly and in an upwardly inclined direction, as shown in Figure 6. The stripping mechanism is mounted in the forward portion of the body 12 adjacent the opening 24, and comprises a pair of endless chains 25 indicated in Figure 3, and one of which is shown in detail in Figure 6. The chains 25 pass over sprocket wheels 26, 27, and 28, a series of such sprocket wheels being carried at each end of the body 12 for suporting the respective chains 25. These chains 25 support transversely extending angle bars 29 which bars are arranged in proper spaced relation, and each bar 29 carries a plurality of spring stripper fingers 30 arranged in spaced relation throughout the length of the respective bars 29. Each spring stripper finger is provided with an outwardly bent hook portion 31.

A stripper drum 32 is mounted below the sprocket wheels 28 and to one side of the sprocket wheels 27 in a manner to cause the chains 25 to bow forwardly and follow the contour of the stripper drum 32 in the manner shown in Figure 6. The drum 32 is supported upon a shaft 33, and this drum 32 is driven by a suitable driving belt 34. A sleeve 35 is carried by the axle 10 and this sleeve carries a suitable pulley which is driven from a belt 36, the belt 36 being in turn driven by a pulley 37 carried by the left-hand drive wheel 11. The sleeve 35 also carries a suitable pulley 38, which drives a belt 39 and this belt 39 passes over a suitable pulley carried by the shaft 40 which supports the sprocket wheel 27 shown in Figure 6. The belt 34 which drives the drum 32 is a cross belt which is driven by a pulley 41 carried by the shaft 40.

A lateral screw conveyor 43 is mounted within a housing 44 carried near the rear of the body 12 and located directly in the rear of the stripping drum 32. This lateral conveyor 43 is driven by a belt 45 through the medium of a pulley 46 carried by the shaft 33. The conveyor 43 is supported upon a shaft 47 and this shaft 47 carries suitable pulleys for receiving the belt 45 and supporting the belt 48, the belt 48 passing around a pulley 49 for driving a shaft 50. The shaft 50 extends across the back of the body 12 and carries a beveled gear 51 which meshes with a beveled gear 52. The beveled gear 52 drives a bucket conveyor 53 mounted in the inclined stack or chute 54, this stack or chute 54 being braced as at 55 and having a suitable discharge spout 56.

As shown in Figure 4, the frame 14 is provided with a suitable draft tongue 14ᵃ to which a suitable draft means may be attached for pulling the machine in a forward direction. The discharge spout 56 may discharge the seed which is elevated by the conveyor 53 into a truck or vehicle located to one side of the machine, as will be obvious.

It should be noted that as the machine travels in the direction of the arrow shown in Figure 6, the endless grass stripper mechanism will travel in the direction of the arrow indicated adjacent the sprocket chain 25 and the spring fingers 30 will grip the seed pods at the top of the grass stems and as the machine travels forwardly the heads of the grass will be stripped from the stems of the grass and pull upwardly between the stripping roller 32 and the fingers 30 in the manner shown in Figure 6. These fingers 30 are preferably formed of wire and are so arranged as to locate the bulged portions of the hooks 31 in contact with the surface of the stripper roller as the endless stripping mechanism passes over the roller 32 in the manner shown in Figure 6. These spring fingers 30 are yieldable and are only of sufficient strength to pull the seed from the grass without injuring or crushing the seed as the seed pass over the stripping roller 32. The seed will be delivered from the roller 32 to the conveyor 43 and from the conveyor 43 to the bucket conveyor 53. The seed is then discharged from the spout 56 into a suitable receptacle or vehicle as described above.

Figure 9:
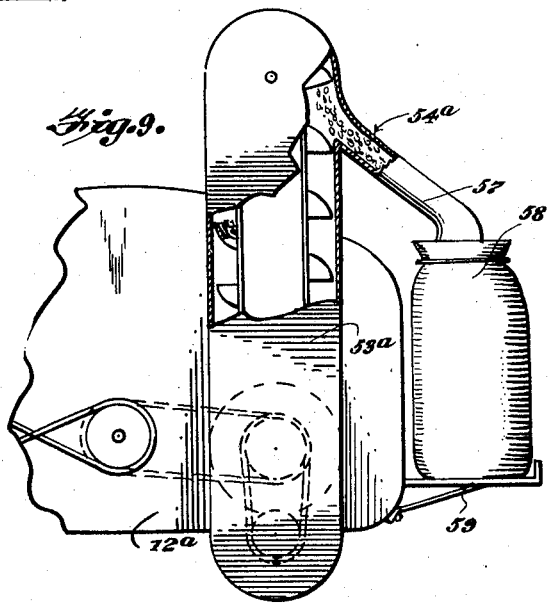
Figure 9 is a fragmentary rear elevational view of a modified form, showing a bagging device associated with the elevator.
Figure 8:
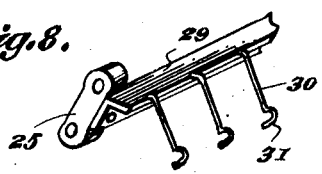
Figure 8 is a fragmentary perspective view of a portion of one of the stripper elements.

In Figure 9 there is shown a modified form of the invention wherein the body 12ᵃ supports a vertical bucket conveyor 53ᵃ, the vertical bucket conveyor 53ᵃ having a discharge spout 54ᵃ to which a tube 57 may be attached leading to a suitable bag 58 which is supported upon a platform 59. The various parts may be driven in any suitable or desired manner and it should be understood that the means for driving the various parts of the structure shown in the drawings may be varied without departing from the spirit of the invention.

From the foregoing description it will be seen that a very simple and efficient grass stripping mechanism has been provided wherein the body 12 is adjustably mounted upon the crank axle to facilitate the raising and lowering of the body and that the body may also be adjusted or tilted by means of the adjusting arm 19 so that the fingers 30 may more efficiently grip the tops of the stems of the grass and in accordance with the heighth of the grass which is to be stripped. The endless stripping mechanism is adapted to travel in a manner to draw the grass up between the endless stripping mechanism and the stripping drum 32 in the manner shown in Figure 6, and the spring fingers 30 by engaging the seed at the upper end of the grass stems will pull the seed from the stems and convey the seed over the surface of the drum 32 without danger of crushing and will then deliver the seed to the conveyor 43 where the seed may be conveyed to a desired point as described above. One of the important elements of the present invention is the construction of the seed stripping mechanism embodying the supporting chains 25 which support the bars 29 and which bars support the spring fingers 30 as shown.

It should be understood that certain detail changes in the mechanical construction and arrangement of parts may be employed without departing from the spirit of the invention, so long as such changes fall within the scope of the appended claims.

Having described the invention, what is claimed as new is:

1. A grass stripper of the class described comprising a body, endless stripping means movable within the body and adapted to engage the tops of growing grass stems for pulling seed within the body, a stripping drum carried within the body, rotary supporting elements carried within the body and carrying said endless stripping means, the endless stripping means conforming to the contour of the stripping drum, said rotating supporting elements holding said endless stripping means in close engagement with the stripping drum as the stripping means passes the drum, and the endless stripping means having yieldable seed-gripping elements for pulling seed from the grass and holding the seed in contact with the stripping drum, and means for driving the rotary supporting elements.

2. A grass stripper of the class described comprising a body, endless stripping means movable within the body and adapted to engage the tops of growing grass stems for pulling seed within the body, a driving and supporting means for said endless stripping means carried by the body, a stripping drum carried within the body and located adjacent the stripping means, the endless stripping means engaging and conforming to the contour of the stripping drum, and the endless stripping means having yieldable seed-gripping elements for pulling seed from the grass and holding the seed in contact with the stripping drum, conveyor means for receiving stripped seed from the stripping drum to carry the seed to a point of discharge.

3. A grass stripper of the class described comprising a body, endless stripping means movable within the body and adapted to engage the tops of growing grass stems for pulling seed within the body, a driving and supporting means for said endless stripping means carried by the body, a stripping drum carried within the body and located adjacent the stripping means, the endless stripping means engaging and conforming to the contour of the stripping drum, the endless stripping means having yieldable seed-gripping elements for pulling seed from the grass and holding the seed in contact with the stripping drum, said yieldable gripping elements comprising spring fingers having outwardly curved seed-gripping terminals.

4. A grass stripper of the class described comprising a body, endless stripping means movable within the body and adapted to engage the tops of growing grass stems for pulling seed within the body, a driving and supporting means for said endless stripping means carried by the body, a stripping drum carried within the body and located adjacent the stripping means, the endless stripping means engaging and conforming to the contour of the stripping drum, the endless stripping means having yieldable seed-gripping elements for pulling seed from the grass and holding the seed in contact with the stripping drum, said yieldable gripping elements comprising spring fingers having outwardly curved seed-gripping terminals, and said fingers being supported upon transversely extending supporting rods carried by the endless stripping means.

5. A grass stripper of the class described comprising a body, a stripping drum rotatably mounted within the body, the body having an open bottom adjacent the drum, seed-gripping means carried by the body, said seed-gripping means comprising endless supporting chains, means supporting the chains and moving the same within the body, the chains being located adjacent to and conforming to the contour of the drum, transverse bars arranged in spaced relation throughout the length of the chains and being arranged in spaced relation with respect to the drum, and spring seed-gripping fingers carried by the bars and adapted to yieldably contact the drum to move the seed over the face of the drum, and means for driving the chains and said drum.

6. A grass stripper of the class described comprising a body, a stripping means carried by the body and adapted to engage the tops of growing grass stems for pulling seed from the grass stems into the body, means within the body for supporting and driving the stripping means having yieldable seed-engaging elements, and an abutment element having a circular contour located adjacent the stripping means for contacting the yieldable seed-engaging elements and removing seed from said seed-engaging elements, the yieldable seed-engaging elements conforming to the contour of the abutment element as the seed-engaging elements pass thereover.

ERITH M. DOWD.
CAMMA L. JOHNSTON,
*Independent Executrix of the Estate of Clarence S. Johnston, Deceased.*